(12) United States Patent
Yu

(10) Patent No.: US 8,931,954 B2
(45) Date of Patent: Jan. 13, 2015

(54) THERMOMETER WITH VOLTAGE SWITCH

(71) Applicant: Mesure Technology Co., Ltd., San Chung (TW)

(72) Inventor: Chu-Yih Yu, San Chung (TW)

(73) Assignee: Mesure Technology Co., Ltd., San Chung, Taipei Hsien (TW)

( * ) Notice: Subject to any disclaimer, the term of this patent is extended or adjusted under 35 U.S.C. 154(b) by 262 days.

(21) Appl. No.: 13/676,148

(22) Filed: Nov. 14, 2012

(65) Prior Publication Data

US 2013/0121378 A1 May 16, 2013

(30) Foreign Application Priority Data

Nov. 14, 2011 (TW) .............................. 100141365 A

(51) Int. Cl.
| | | |
|---|---|---|
| G01K 1/00 | (2006.01) | |
| G01K 7/00 | (2006.01) | |
| G01K 7/02 | (2006.01) | |
| G01K 13/00 | (2006.01) | |

(52) U.S. Cl.
CPC .............. G01K 7/02 (2013.01); G01K 13/002 (2013.01); G01K 2215/00 (2013.01)
USPC ........................................... 374/208; 374/163

(58) Field of Classification Search
USPC .......................................... 374/208, 163, 152
See application file for complete search history.

(56) References Cited

U.S. PATENT DOCUMENTS

| | | | | |
|---|---|---|---|---|
| 3,547,707 A | * | 12/1970 | Bragg et al. .................... | 136/224 |
| 4,022,063 A | * | 5/1977 | West et al. ..................... | 374/158 |
| 2011/0098966 A1 | * | 4/2011 | Suzuki ........................... | 702/133 |
| 2013/0121375 A1 | * | 5/2013 | Yu .................................. | 374/170 |

* cited by examiner

Primary Examiner — Mirellys Jagan
(74) Attorney, Agent, or Firm — McClure, Qualey & Rodack, LLP

(57) ABSTRACT

A thermometer includes a body member and a tip member with a thermal contact surface secured to the body member. A thermal sensor mounted on the inside of the tip member is adapted for sensing a thermal contact surface and producing a temperature signal. A set of lead wires is coupled to the thermal sensor for transmission of the temperature signal. A display module is disposed in the body member. An electric generator with a start voltage and an operation voltage is disposed in the body member. A capacitor is electrically connected to the electric generator for storing the electric energy generated by thereof and supplying the electric energy to the processor. A voltage switch with a threshold voltage is electrically connected between the capacitor and the processor, in which the threshold voltage is lower than the operation voltage.

9 Claims, 2 Drawing Sheets

THERMOMETER WITH VOLTAGE SWITCH

BACKGROUND OF THE INVENTION

1. Field of the Invention

The invention relates to the field of thermometers, and more particularly to the field of thermometers with voltage switch.

2. Description of the Related Art

Electronic thermometers generally offer a great number of advantages over conventional glass and mercury thermometers for use in the health care field. Among the advantages of electronic thermometers are the elimination of sterilization procedures for glass thermometers, made possible by the use of disposable covers; elimination of the possibility of broken glass if a thermometer is dropped; a digital temperature display to eliminate temperature reading errors; and with proper circuit design and calibration, higher accuracy and resolution is possible with accurate measurement and display of tenths of a degree Fahrenheit being easily attainable.

Such electronic thermometers typically use a chemical battery as a power supply. However, the electronic thermometers are generally idle for a long time since patients only use the electronic thermometers while they are sick or feel uncomfortable. Thus such electronic thermometers employing a chemical battery as a power supply are not environmentally friendly.

SUMMARY OF THE INVENTION

An exemplary embodiment of the present invention overcomes the above-described problems by providing a thermometer includes a body member and a tip member with a thermal contact surface secured to the body member. A thermal sensor mounted on the inside of the tip member is adapted for sensing a thermal contact surface and producing a temperature signal. A set of lead wires is coupled to the thermal sensor for transmission of the temperature signal. A display module is disposed in the body member. An electric generator with a start voltage and an operation voltage is disposed in the body member. A capacitor is electrically connected to the electric generator for storing the electric energy generated by thereof and supplying the electric energy to the processor. A voltage switch with a threshold voltage is electrically connected between the capacitor and the processor, in which the threshold voltage is lower than the operation voltage.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
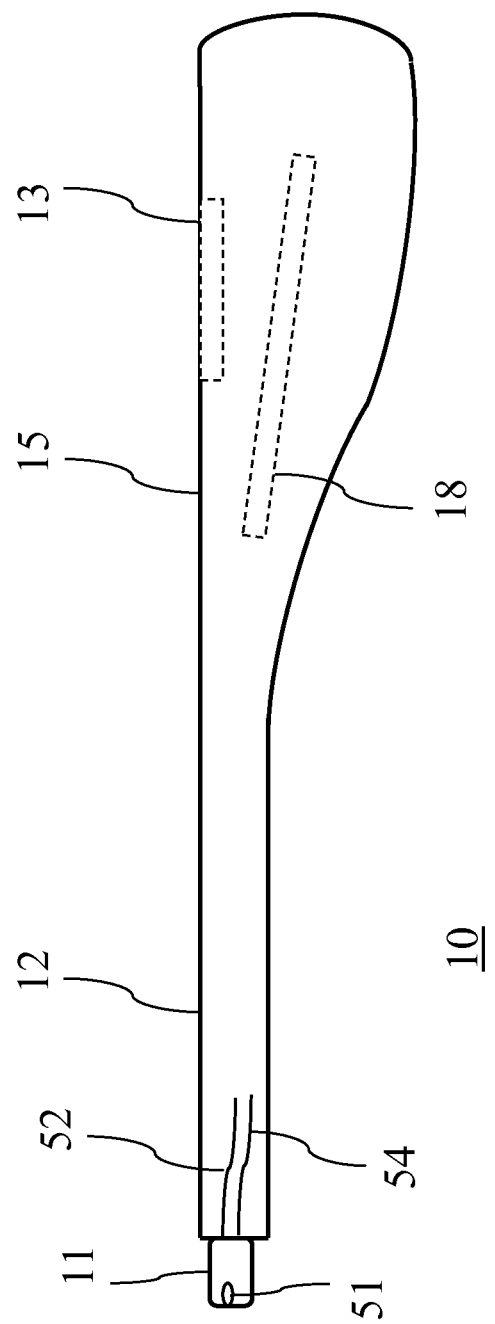
FIG. 1 is a schematic view of a thermometer according to an exemplary embodiment of the invention.
Figure 2:
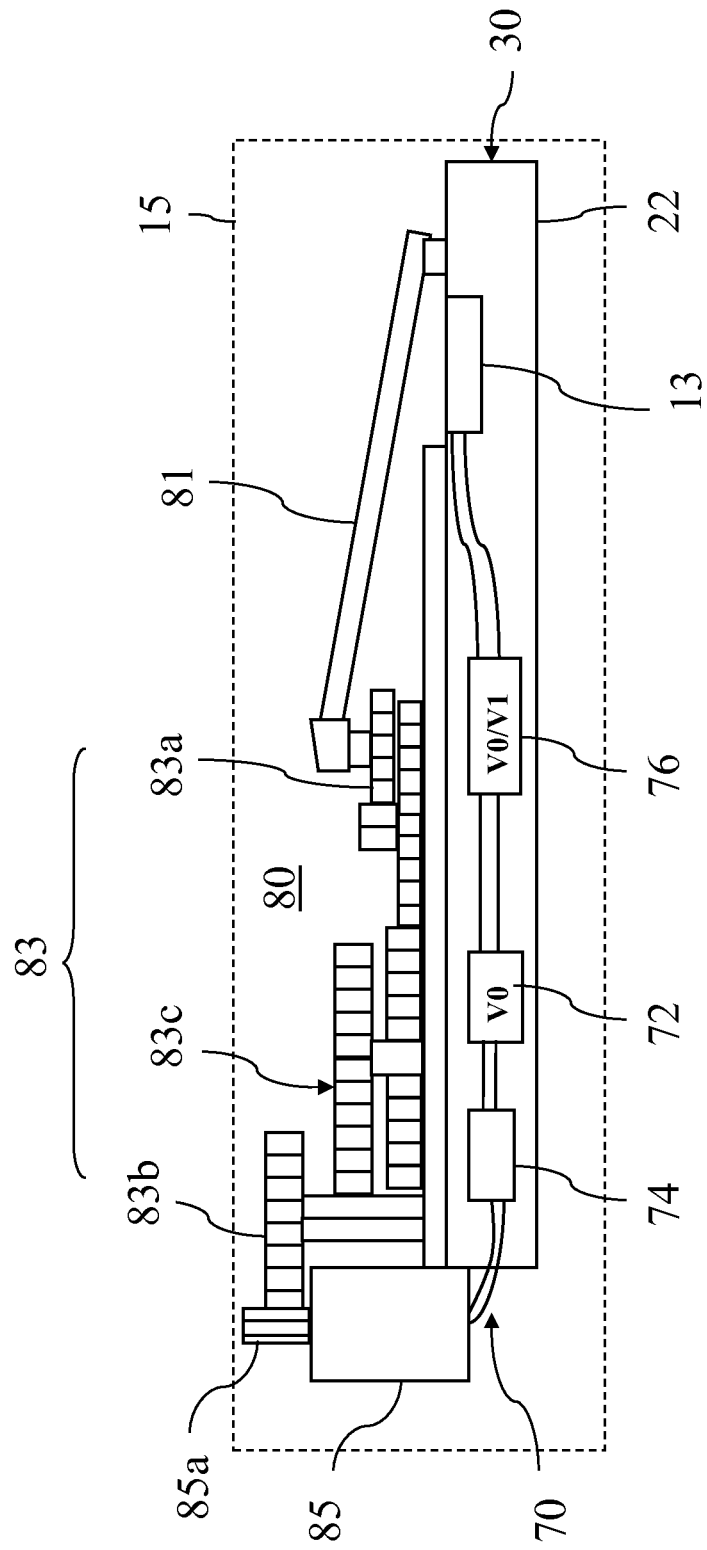
FIG. 2 is a schematic view of a thermometer with electric generator according to an exemplary embodiment of the invention.

Referring to FIGS. 1 and 2, an embodiment of a thermometer is illustrated. The thermometer is made up of a body member 10 and a tip member 11. Typically, body member includes a probe portion 12 and a display portion 15. Tip member 11 is secured to probe portion 12 of body member 10. Preferably, it contains a thermal contact surface surrounding a hollow cavity. In one embodiment, hollow tip member 11 is preferably made of metal with good thermal conductivity, such as stainless steel.

A thermal sensor 51 is placed at the end of tip member 11 and mounted on the inside of the thermal contact surface. Thermal sensor 51 senses the temperature of the thermal contact surface and produces a temperature signal. There are a set of lead wires 52 and 54 coupled to thermal sensor 51 for transmission of the temperature signal.

As shown in FIG. 2, a display module 13 is disposed in display portion 15 and connected to lead wires 52 and 54 to receive the temperature signal for display of a corresponding temperature reading. In one example, display portion 15 may comprise a base plate 30 with a substrate 22 to support display module 13. A processor 76, such as integrated circuit chip, is disposed on substrate 22 to be coupled to display module 13. Processor 76 is electrically connected to lead wires 52 and 54 to receive the temperature signal; it drives display module 13 to show a corresponding temperature reading. Typically, base plate 30 is made from a plastic material and substrate 22 is a PCB board.

In one example, tip member 11 is made in the form of a tubular shape and closed at a domed, hemispherical or hemiellipsoid shaped end. The contact surface is brought in contact with flesh of a patient so that heat can be transferred from the patient's flesh to tip member 11. In one embodiment, thermal sensor 51 is thermistor. Lead wires 52 and 54 and thermistor 51 are both adhered on the inside of the thermal contact surface with heat conductive glue. The glue is an insulating material with good thermal conductivity, e.g., epoxy resin. Moreover, lead wires 52 and 54 are made up of a pair of electrical lead wires; they are used to connect thermal sensor 51 to processor 76 for determining a corresponding temperature to display.

Adverting to FIG. 2, an electric power generator 80 is disposed in body member 10. Electric power generator 80 having a motor 85 with a rotary shaft 85a is employed to generate a current at output terminals thereof when rotary shaft 85a is manually rotated in one direction by an external force. Specifically, the output terminals of motor are electrically connected to a capacitor 74 through wires 70. In addition, motor 85 is driven for generating electric energy when rotary shaft 85a is rotated. A capacitor 74 is electrically connected to electric generator 80 for storing the electric energy generated and supplying the electric energy to processor 76.

In one embodiment, a mechanical part of electric generator 80 further comprises a handle 81 mounted into a surface of body member 10 and a set of gears 83 disposed on substrate 22 of base plate 30. The set of gears 83 are detachably secured to handle 81 and coupled to drive rotary shaft 85a. For example, when handle 81 is rotated manually, the set of gears 83 is rotated so that rotary shaft 85a is rotated to drive motor 85 for generating the electric energy. In addition, the set of gears 83 may comprise a handle gear 83a detachably mounted on handle 81 coaxially with a rotation center of handle 81. A drive gear 83b is meshed with handle gear 83a directly or through other gears 83c so that the rotation of handle gear 83a is transmitted to drive gear 83b. Thus rotary shaft 85a meshed with drive gear 83b is rotated.

Moreover, with reference to FIG. 1 thermometer 10 further comprises a groove 18 formed on the surface of body member 15 as a container for storing handle 81 in a non-used position.

An operation of this embodiment will be described.

When handlehandle 81 is rotated in one direction manually, handle gear 83a is rotated and hence drive gear 83b meshed with handle gear 83a is rotated. Since drive gear 83b is meshed with or detachably secured to rotary shaft 85*a*, a rotor of motor 85 is driven by the rotation of drive gear 83*b*, so that motor 85 is operated as a generator and electric energy is generated. The thus generated electric energy is supplied through the set of wires 70 to capacitor 74 and stored therein. In one example, when handle 81 is designed to be only rotated in one direction by an external force, rotary shaft 85*a* is rotated in the same direction and the D.C. electric energy is stored in capacitor 74. Consequently, a rectifier in the generator can be neglected.

Specifically, when motor 85 starts to rotate after this rotational driving, motor 85 is driven as the generator and the value of current generated thereby increases quickly. Capacitor 74 is gradually charged and the terminal voltage thereof increased gradually. That is, the D.C. electric energy generated by motor 85 working as the generator is stored in capacitor 74.

When the manual driving of handle 81 is stopped at a time instance from the start of the driving by letting the hand of the user off from handle 81, the D.C. electric energy stored in capacitor 74 is supplied to processor 76 and the terminal voltage value is reduced gradually. With stoppage of the driving of the motor 85, the D.C. electric energy stored in capacitor 74 was discharged completely.

Furthermore, a voltage switch 72 with a threshold voltage V0 may be disposed on substrate 22 of base plate 30. In one example, voltage switch 72 is electrically connected between capacitor 74 and processor 76.

Also, processor 76 with a lower start voltage and a higher operation voltage is electrically connected to both capacitor 74 to obtain electric power and the set of lead wires 52 and 54 to receive the temperature signal such that it can drive display module 13 for display of a corresponding temperature reading. In one example, capacitor 74 stores electrical energy by continuously rotating handle 81. consequently, voltage switch 72 turns on such that processor 76 is actuated to generate voice through a speaker to inform the user or drive display module 13 to display a starting signal showing a status that the thermometer starts or performs a self-test, while the charged capacitor voltage is increased to at least the start voltage of about 1.3V, nearly equal to or slightly higher than the threshold voltage of the voltage switch 72.

After that, Processor 76 is actuated to generate voice through a speaker to inform the user or drive display module 23 to display an operation signal showing a status that the thermometer is ready to perform a body temperature measuring operation action, while the charged capacitor voltage is further increased to at least the operation voltage V1 of about 1.5V, higher than the start voltage, which is enough to perform at least one or two cycles of body temperature measuring operation.

When the manual driving of handle 81 is stopped at a time instance from the start of the driving by letting the hand of the user off therefrom, the D.C. electric energy stored in capacitor 74 is supplied to processor 76 and the terminal voltage value is reduced gradually. With stoppage of the driving of motor 85, the D.C. electric energy stored in capacitor 74 is discharged completely later. Further, voltage switch 72 then turns off while the terminal voltage value of capacitor 74 is reduced gradually to lower than threshold voltage V0.

In such thermometers, capacitor stores energy through the rotation of the handle by an external force for the processor to use on demand, so it can be used like a temporary battery to maintain power supply. Thus, there is no need to use a chemical battery which is easy to cause environmental pollution.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A thermometer comprising:
    a body member and a tip member with a thermal contact surface secured to the body member;
    a thermal sensor mounted on the inside of the tip member, adapted for sensing the thermal contact surface and producing a temperature signal;
    a set of lead wires, coupled to the thermal sensor for transmission of the temperature signal;
    a display module, disposed in the body member;
    a processor with a start voltage and an operation voltage, electrically connected to the set of lead wires to receive the temperature signal, driving the display module for display of a corresponding temperature reading;
    an electric generator, disposed in the body member, being driven for generating electric energy;
    a capacitor, storing the electric energy generated by the electric generator and supplying the electric energy to the processor; and
    a voltage switch with a threshold voltage, electrically connected between the capacitor and the processor, wherein the threshold voltage is lower than the operation voltage.

2. The thermometer as recited in claim 1, wherein the threshold voltage is nearly equal to or slightly lower than the start voltage.

3. The thermometer as recited in claim 2, wherein the voltage switch turns on such that the processor is actuated to generate voice through a speaker to inform the user or drive the display module to display a starting signal showing a status that the thermometer starts or performs a self-test, while a charged voltage of the capacitor is increased to at least the start voltage.

4. The thermometer as recited in claim 3, wherein the processor is actuated to generate voice through the speaker to inform the user or drive the display module to display an operation signal showing a status that the thermometer is ready to perform the body temperature measuring operation action, while the charged voltage of the capacitor is further increased to at least the operation voltage.

5. The thermometer as recited in claim 3, further comprising a base plate with a substrate, wherein the display module, the processor, the voltage switch and the capacitor are disposed on the substrate.

6. The thermometer as recited in claim 5, the electric generator further comprising:
    a motor with a rotary shaft, disposed in the body member;
    a handle, mounted into a surface of the body member; and
    a set of gears, disposed in the body member, detachably secured to the handle and coupled to drive the rotary shaft, wherein when the handle is rotated manually, the set of gears is rotated such that the rotary shaft is rotated to drive the motor for generating the electric energy.

7. The thermometer as recited in claim 6 wherein the set of gears comprises:
    a handle gear, detachably mounted on the handle coaxially with a rotation center of the handle; and
    a drive gear, meshed with the handle gear and the rotary shaft.

8. The thermometer as recited in claim 7, further comprising a groove formed on the surface of the body member as a container for storing the handle in a non-used position.

9. The thermometer as recited in claim 8, wherein when the handle is manually rotated in one direction only, the motor is driven for generating D.C. electric energy.

* * * * *